May 25, 1943.    G. S. PERKINS    2,320,297
MACHINE FOR DECORATING COATED CANDIES
Filed Nov. 6, 1941    5 Sheets-Sheet 1
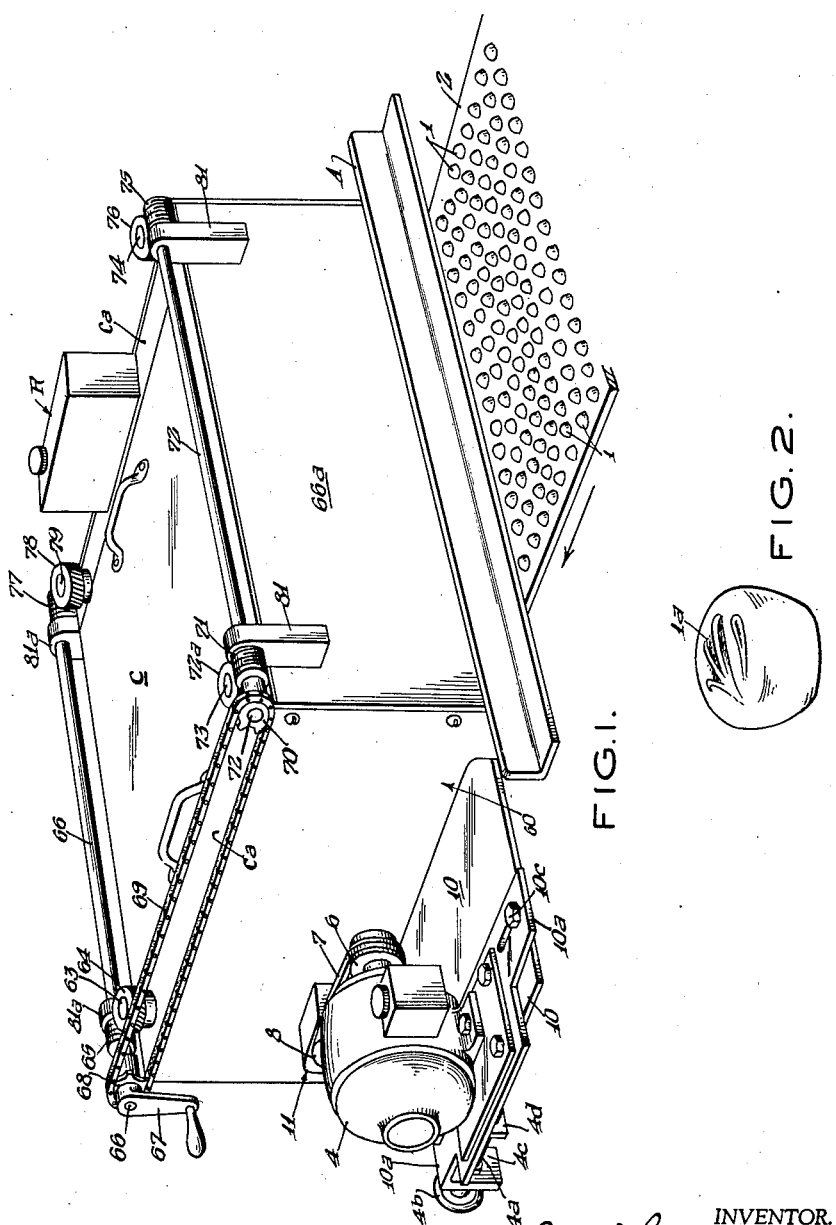
INVENTOR.
George S. Perkins
BY Mock + Blum
ATTORNEYS

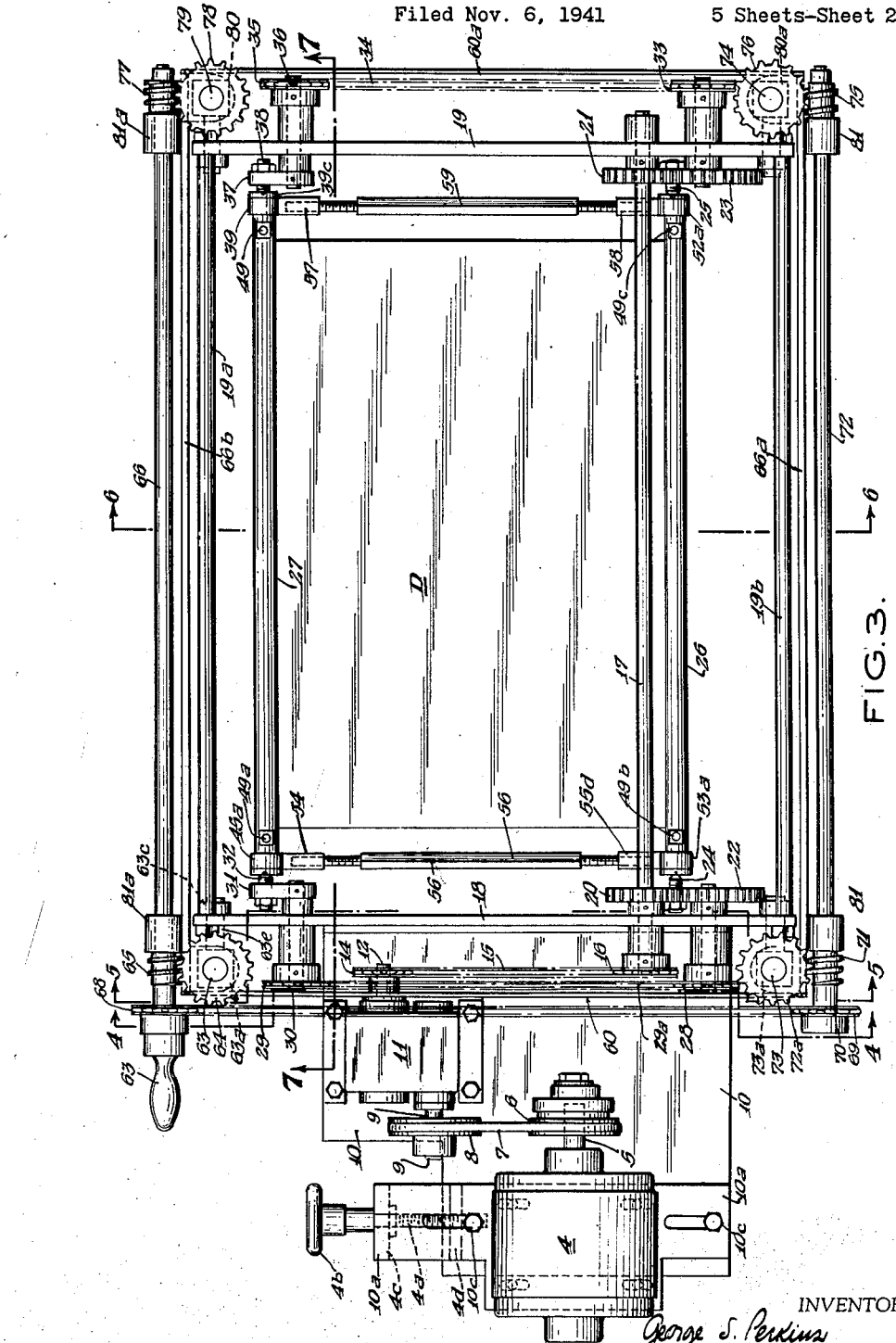

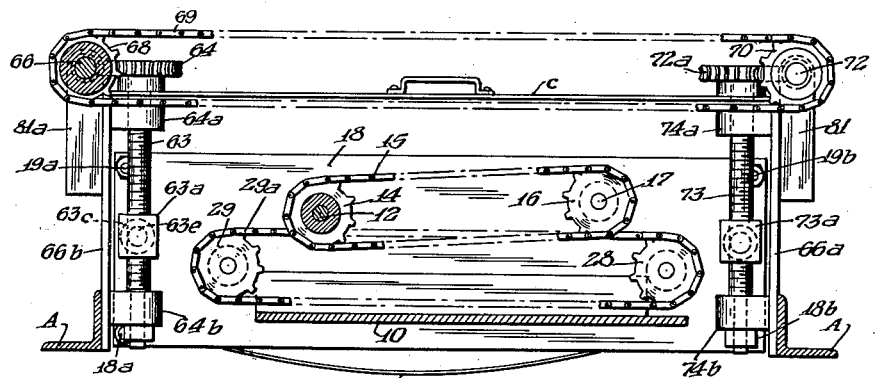

May 25, 1943.　　　G. S. PERKINS　　　2,320,297
MACHINE FOR DECORATING COATED CANDIES
Filed Nov. 6, 1941　　　5 Sheets-Sheet 4
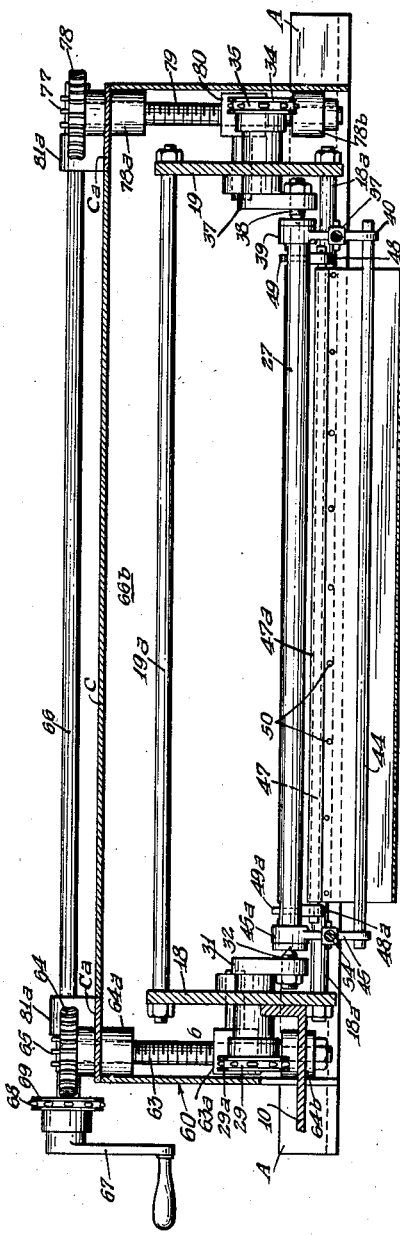
INVENTOR.
George S. Perkins
BY Mock & Blum
ATTORNEYS May 25, 1943.  G. S. PERKINS  2,320,297
MACHINE FOR DECORATING COATED CANDIES
Filed Nov. 6, 1941  5 Sheets-Sheet 5

INVENTOR.
George S. Perkins
BY Mock & Blum ATTORNEYS

UNITED STATES PATENT OFFICE 2,320,297

MACHINE FOR DECORATING COATED CANDIES

George S. Perkins, Kew Gardens, N. Y., assignor to National Equipment Co., New York, N. Y., a copartnership composed of Joseph Greenberg, Herman Greenberg, Samuel Greenberg, and Sidney Greenberg Application November 6, 1941, Serial No. 418,089

6 Claims. (Cl. 91—2)

My invention relates to a new and improved machine for decorating coated candies.

One of the objects of my invention is to provide a machine which can be applied as an attachment to an enrober or the like, said improved machine having a flexible decorating member which is supported at the end-portions thereof.

Another object of the invention is to provide improved mechanism whereby said decorating member can be lowered so that its bottom surface contacts with the coated candies which are supported upon a travelling feed belt, so that the bottom surface of the decorating member will contact with the coatings of a plurality of lateral rows of said coated candies, while said feed belt is moving said coated candies in a predetermined longitudinal direction.

Another object of the invention is to move the decorating member longitudinally and in the same direction as the longitudinal movement of the feed belt, and at substantially the same speed as the feed belt, so that there is little or no relative longitudinal movement between the decorating member and the feed belt, during the period in which the decorating member contacts with the coatings of the candies which are being moved longitudinally by the feed belt.

Another object of the invention is to raise the decorating member, relative to the feed belt, after the decorating member has thus been applied to the top surfaces of the coatings of the candies, in order to draw a string or strings of the coating of each candy upwardly.

The decorating member may be made of any suitable flexible material, perforated or unperforated, or it may be of link formation, as long as the decorating member can hang freely in a bight or curve between the ends of said decorating member.

Another object of the invention is to continue the forward movement of the decorating member in the direction of movement of the feed belt, and at substantially the same forward speed as said feed belt, at the beginning of the upward drawing of the string or strings from the coating of each candy.

Another object of the invention is to move the decorating member longitudinally and in a direction opposed to the direction of movement of the feed belt, after the string or strings have been drawn upwardly to the desired height, so that the string or strings will lose their adhesion to the decorating member and said string or strings will fall back upon the surfaces of the respective candies, in order to decorate the same.

Another object of the invention is to time the movement of the decorating member relative to the movement of the feed belt, so that upon each downward movement of the decorator, it is applied to fresh candies and each candy contacts preferably only once with the decorating member.

Another object of the invention is to provide suitable adjusting mechanism, whereby the vertical distance between the top surface of the decorating belt and the bottom surface of the decorator, when the decorator is in its bottom position, can be adjusted, in order to allow for candies of different heights and for coatings of different thickness.

Another object of the invention is to provide a machine of simple and efficient design, which can be manufactured at low cost and which will be simple and reliable in operation.

Other objects of the invention will be stated in the annexed description and drawings, which illustrate a preferred embodiment thereof.

Fig. 1 is a perspective view of the improved machine, with the cover in position.

Fig. 2 is a perspective view showing a candy having one type of decoration.

Fig. 3 is a top plan view of the machine with the cover removed.

Figs. 4-7, inclusive, are respectively sectional views on the lines 4—4, 5—5, 6—6 and 7—7 of Fig. 3. In Fig. 5, part of the representation of the wall 18 has been omitted.

In Fig. 5, the decorating member is shown in a position which is midway between its top position and its bottom position, and in Fig. 6 the decorating member is shown in its bottom position.

Fig. 8 is a sectional view on the line 8—8 of Fig. 6.

Fig. 9 is a sectional view on the line 9—9 of Fig. 8.

Figure 10:
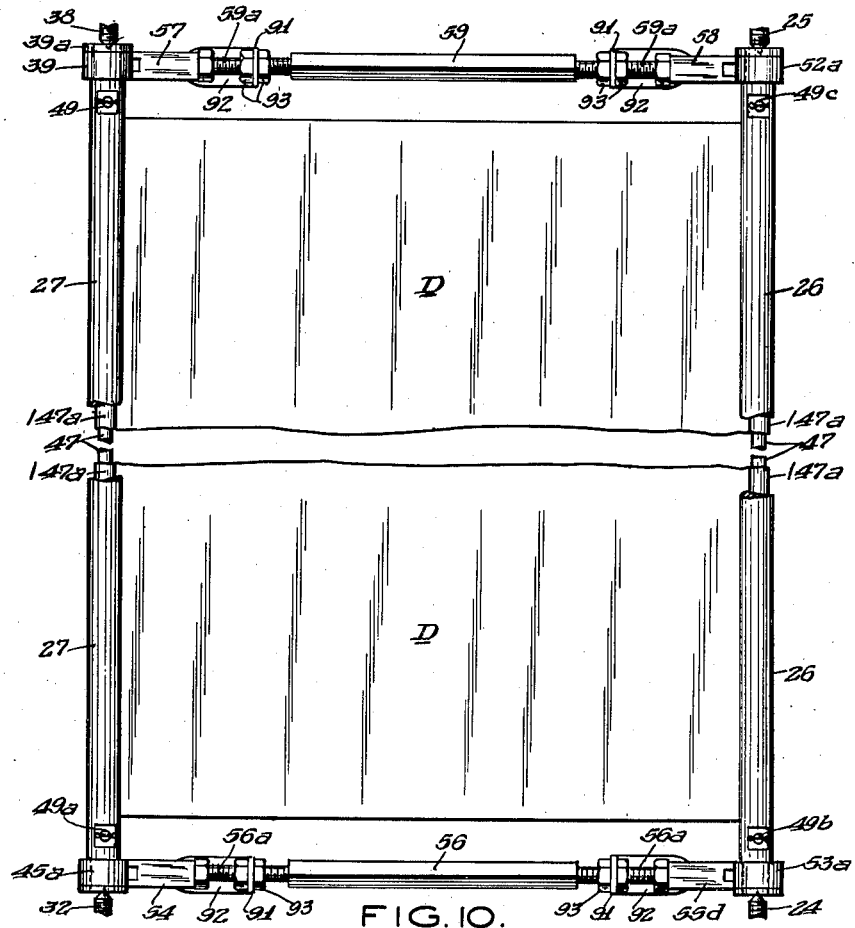

Fig. 10 is a top plan view of the decorator and the means for supporting the lateral end-portions of the decorator.

Figure 11:
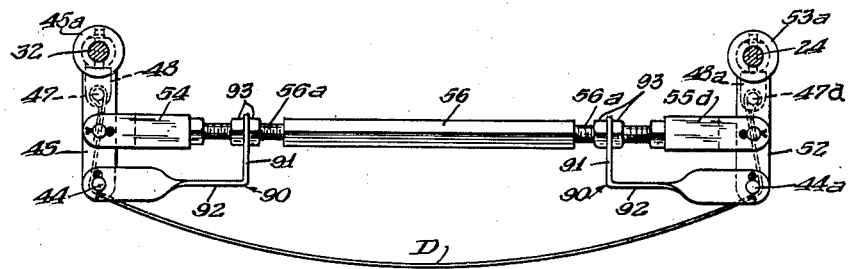

Fig. 11 is an end view of Fig. 10.

It has heretofore been proposed to use a flexible decorating member, perforated or unperforated, and to connect the ends of said flexible decorating member to suitable rigid supports which are moved up and down. It has also been previously proposed to make such decorating member of flexible material and to provide an imperforate or perforate decorating member.

In the former and in the present use of a perforate decorating member, such decorating member has not been used in order to stamp the plastic coating of a candy. On the contrary, the function of a perforated decorating member as previously used, and in the present improved machine, is mainly to draw out one or more strings of the plastic coating of each candy, and then to release the string or strings, so that such string or strings drop back into contact with the coating of the respective candy.

Fig. 1 shows the top run of the conventional endless feed belt 2, upon which the coated candies 1 are supported. The coatings of the candies 1 are then in the plastic condition. Said coatings are suitably heated in order to maintain the same in such plastic condition, so that the strings can be easily drawn out of such coatings.

The direction of longitudinal movement of the top run of belt 2 is indicated by the corresponding arrow in Fig. 1. The belt 2 is ordinarily made of wire mesh, and it is of the endless type which delivers the candies from the enrober or other suitable machine, to the improved device. The improved device is supported upon lateral angle irons A, which are fastened to any suitable base or support.

Fig. 3 shows the rigid and stationary front and rear walls 66a and 66b which are fixed to the respective angle irons A. Fig. 1 shows the wall 66a. Fig. 1 shows one of the removable side walls 60, which are removably fixed to the walls 66a and 66b. The side wall 60a which is opposite to the side wall 60, is also removably fixed by suitable fastening members, to the fixed vertical walls 66a and 66b.

Fig. 3 shows the vertically adjustable side walls 18 and 19, which are parallel to each other and which are also parallel to the removable side walls 60 and 60a. As shown, for example, in Figs. 4 and 6, the top portions of the vertically adjustable walls 18 and 19 are rigidly connected to each other by respective fixed longitudinal bars or braces 19a and 19b, and the bottom portions of said adjustable walls 18 and 19 are rigidly connected to each other by respective fixed longitudinal bars or braces 18a and 18b.

The vertically adjustable walls 18 and 19 are thus moved in unison, either upwardly or downwardly.

Referring to Figs. 3 and 4 and 5, nuts 63a and 73a are fixed to the wall 18. As shown in Fig. 6, nuts 80 and 80a are fixed to the wall 19. As shown in Fig. 3, the nut 63a has an integral extension 63e, which is suitably and rigidly fixed to the corresponding part of the wall 18. A collar 63c is rigidly fixed to the stud-extension 63e. The other nuts 73a, and 80 and 80a are correspondingly rigidly fixed to the respective walls 18 and 19.

Upper laterally spaced bearing collars 64a and 78a, which are shown in Figs. 4 and 6, are fixed to the upper part of the fixed rear wall 66b, by means of welding or the like. Lower and laterally spaced bearing collars 64b and 78b are rigidly fixed to the lower part of the stationary rear wall 66b. Upper and laterally spaced bearing collars 74a and 76a are fixed to the upper part of the stationary front wall 66a, and lower and laterally spaced bearing collars 74b and 76b are fixed to the bottom part of the stationary front wall 66a.

Each lateral fixed wall 66b and 66a is therefore provided with two bearing collars at its top portion and with two bearing collars at its bottom portion. These bearing collars are arranged in superposed pairs. For example, the bearing collar 64a is directly above the bearing collar 64b, and said bearing collars 64a and 64b have bores which have a common longitudinal axis. A screw is located in the bores of each pair of superposed bearing collars. The screw 63 is turnably mounted in the bearing collars 64a and 64b. The screw 73 is turnably mounted in the bearing collars 74a and 74b. These screws 63 and 73 are right-hand screws. A screw 79 is turnably mounted in the bearing collars 78a and 78b. A screw 74 is turnably mounted in the bearing collars 76a and 76b. The screws 79 and 74 are left-hand screws.

Each said screw has reduced extensions which fit turnably in the bores of the respective bearings collars and each extension extends above the respective upper bearing collar and below the respective lower bearing collar. The lower reduced extension of each screw is provided with an end-thrust collar. For example, and as shown in Fig. 6, the screw 79 has an end-thrust collar 79c fixed to its bottom reduced extension, so as to prevent the upward movement of the screw 79, relative to its bearing collars 78a and 78b. The upper reduced extension of each screw has a worm gear fixed thereto. The worm gears 64 and 72a are respectively fixed to the upper reduced extensions of the screws 63 and 73, and each said worm gear has a hub which is fixed to the respective reduced extension, and each said hub abuts the top wall of the respective upper bearing collar. The worm gears 78 and 76 are respectively similarly fixed to the upper reduced extensions of the screws 79 and 74.

As shown in Fig. 1, these worm gears 64, 78, 72a and 76 are located above the removable cover C, which can be suitably fixed to the stationary walls 66a and 66b. The machine is also provided with supplemental cover members Ca.

As shown in Fig. 1, the worm gears 64 and 78 mesh respectively with worms 65 and 77, which are fixed to a common lateral shaft 66. The worm gears 72a and 76 mesh respectively with worms 71 and 75, which are fixed to a common lateral shaft 72. The shaft 66 is mounted turnably in bearing brackets 81a, which are fixed to the stationary rear wall 66b in any suitable manner, as by welding or the like. The bearing brackets 81 of the shaft 72 are fixed in any suitable manner to the stationary wall 66a. The shaft 66 is manually turnable by means of a handle 67. The shafts 66 and 72 have respective associated sprockets 68 and 70, which are connected by a chain 69.

Therefore, by turning the handle 67, the four screws 63, 73, 79 and 74 are simultaneously and equally turned, so as to raise or lower the vertically adjustable side walls 18 and 19 equally and in unison, by means of the respective nuts of said vertical screws.

Each lateral end-portion of the decorating member D is folded, so as to form a closed loop. For example, Fig. 9 shows one end of the flexible decorating member D, and its closed loop 147a. The end of said loop 147a is fixed by means of a rivet or other fastening member 50, to the respective end of the decorating member D. As shown in Figs. 8 and 9, a lateral rod 47 passes through this loop, in order to support the corresponding end-portion of the decorating member D. Referring to Fig. 6, the lateral rod or bar 47a corresponds to the lateral rod 47, so that the rod 47a supports the other lateral end of the decorating member D. The longitudinal axes of the rods 47 and 47a are parallel to each other, and said axes are longitudinally spaced, that is, in the direction of the longitudinal movement of the feed belt 2.

Referring to Fig. 8, one end of the rear lateral rod 47 is turnably mounted in a bearing 48. This has a reduced stud-extension 49, which has a tight fit in a bore of the turnable shaft 27. A cotter pin 47b is provided in order to prevent the rod 47 from moving in the direction of its longitudinal axis, out of the bearing 48. As shown in Fig. 8, the turnable shaft 27 is provided with a reduced end 27a, on which a sleeve 39 is rigidly secured in any suitable manner. Fig. 8 also shows the collar 39c which is removably fixed to the reduced end 27a by means of a suitable set screw. One end of the sleeve 39 abuts a shoulder of the shaft 27. The sleeve 39 has an integral and rigid extension 40, in whose bore one end of a lateral rod 44 is turnably mounted. A cotter pin 46 is provided for the usual purpose.

Fig. 9 shows that a part of the decorating member D is in contact with a part of the lateral rod 44. The construction is identical at each lateral end-portion of the decorating member D, and at each end of the lateral shaft 27.

As shown in Fig. 8, a bushing 41 is located in a recess of the reduced end 27a of the shaft 27. A part of the conical end of a bearing pin 38 is located in said bushing 41. The shank of said bearing pin 38 is threaded and said bearing pin 38 is adjustably mounted in a tapped bore of a crank arm 37. This crank arm 37 is fixed to a shaft 36. When the shaft 27 is described as being turnable, this means that it can turn relative to its respective bearing pins 38 and 32. Fig. 3 shows the bearing pin 32 for the end of the shaft 27 which is opposed to the end which is shown in Fig. 8. The bearing pin 32 is adjustably connected to a crank arm 31, which is fixed to the shaft 30. The shafts 30 and 36 have a common longitudinal axis and the radial distance of the longitudinal axis of the bearing pin 32, from the longitudinal axis of its shaft 30, is equal to the corresponding radial distance of the bearing pin 38, relative to the shaft 36.

The longitudinal axis of the bearing pin 32 is thus moved through a circle 381, which is indicated in Fig. 5. The shaft 27 is thus moved up and down relative to the top run of the feed belt 2. Said shaft 27 is also moved longitudinally in the same direction as the top run of the feed belt 2, and it is also moved longitudinally in a direction reverse to the direction of movement of the top run of the feed belt 2. As indicated in Figs. 5 and 6, the shaft 27 is moved longitudinally in the same direction as the top run of the feed belt 2, while the decorator D is being lowered, and also while the decorator D contacts with the coatings of the candies 1. The decorator D is also moved longitudinally in the same direction as the top run of the belt 2, for the very short interval of time in which the decorator begins to draw out a string or strings from the coating of each candy 1, with which the decorator D contacts.

Fig. 1 shows that the candies 1 are located laterally, substantially from one longitudinal edge of the belt 2 to the other longitudinal edge thereof. The decorator D is made of sufficient width so that it contacts with the candies, laterally from one longitudinal edge of the belt 2 to the other edge thereof. Likewise and as shown in Fig. 6, when the decorator D is in its contacting position, it contacts with the coatings of a large number of laterally disposed rows of candies 1.

As shown in Fig. 6, one of the lateral end portions of the decorator D is in partial contact with a rod 44a, which is mounted turnably in the extension 55 of a collar 52a. Referring to Fig. 3, the collar 52a is fixed to one reduced end of a shaft 26, the construction being identical with that shown in Fig. 8. The extension 55 is integral with the collar 52a. The shaft 26 is supported by, and it is turnable relative to, the bearing pins 24 and 25. The eccentric bearing pin 24 projects from a face of the spur gear 22, which meshes with a spur gear 20. The shaft of the spur gear 22 has a bearing in the vertically adjustable side wall 18. The shaft 17 of the spur gear 20 likewise has a bearing in the vertically adjustable wall 18. Likewise, the shaft 30 has a bearing in said wall 18. The shaft 30 and the shafts of the spur gears 20 and 22 are therefore moved upwardly and downwardly in unison when the wall 18 is vertically adjusted. The shaft of the spur gear 22 is provided with a sprocket 28, which is connected by a suitable chain 29a to a sprocket 29, which is fixed to the shaft 30. The shaft 17 of the spur gear 20 is provided with a sprocket 16, which is connected by a chain 15 to a sprocket 14, which is fixed to the driven shaft 12. The driven shaft 12 is driven by means of speed-reducing gears of the conventional type, which are located in the usual gear box 11. The speed reducing gears provide a speed-reducing ratio of 50 to 1. Said reducing gears are driven by the drive shaft 9, to which a pulley 8 is fixed. Said pulley 8 is connected by a belt 7 to a pulley 6, which is fixed to the shaft 5 of an electric motor 4. The pulley 6 is of the conventional speed-regulating type, so that the speed at which the gears in box 11 are driven, depends on the tension of belt 7. This is known as the "Hi-Lo" drive, and it is similar to the "Reeves" variable-speed pulley. The gear box 11 is supported by a plate 10, which is fixed to the vertically adjustable wall 18. The motor 4 is mounted upon the same plate 10 so that the position of the motor 4 is vertically adjusted in unison with the vertical adjustment of the wall 18.

In order to tighten the belt 7 and thus to regulate the effective diameter of the pulley 8, and thus to regulate the speed of the gears in box 11, the motor 5 can be longitudinally adjusted in a direction parallel to the direction of movement of the feed belt 2. The motor 4 rests upon a plate 10a, which is slidable upon the supporting plate 10. The slidable plate 10a has a downwardly bent lug 4c which has a bore through which the shank of the adjusting screw 4a passes. Said adjusting screw 4a is provided with the usual hand wheel 4b. The shank of the adjusting screw 4a passes through the tapped bore of the downwardly bent lug 4d of the supporting plate 10. The adjusting screw 4a is prevented from moving longitudinally relative to the lug 4c, by conventional means. Therefore, when the hand wheel 4b is turned, the plate 10a is adjusted relative to the plate 10. After this adjustment has been made, the plate 10a is clamped in its adjusted position, by means of clamping screws 10c which extend through suitable slots in the plate 10a.

The speed change gears in the casing 11 may be of the well known type which permit accurate regulation of the driven shaft 12, thus permitting accurate regulation of the speed of rotation of the spur gears 20 and 22. The shaft 17 of the spur gear 20 is provided with the companion spur gear 21, which is also fixed to said shaft 17. The shaft 17 has its bearings respectively in the vertically adjustable walls 18 and 19. The spur gear 21 meshes with a spur gear 23, whose shaft has its bearing in the vertically adjustable wall 19. As shown in Fig. 3, the shaft 36 of the crank arm 27 also has its bearing in the vertically adjustable wall 19.

When the shaft 17 is thus rotated by means of its sprocket 16, the spur gears 22 and 23 are rotated in unison with said shaft 17. The shaft 26 is thus moved in unison with the shaft 27 by means of the bearing pins 24 and 25 in said shaft 26.

The respective longitudinal axes of the shafts 26 and 27 therefore always remain parallel to each other and always at the same height. As previously noted, the shaft 30 is rotated in unison with the shaft 17, by means of the sprocket 29 of said shaft 30. The shaft 36 is rotated in unison with the shaft 30, by means of the sprocket 35 which is fixed to the shaft 36, the chain 34 and the sprocket 33 which is fixed to the shaft of the spur gear 23.

Means are provided for regulating the longitudinal distance between the rods 44 and 44a, in order to regulate the curvature of the decorating member D. This also regulates the distance between the bottom of the decorating member D and the top of the said belt 2 when the decorating member D is in the bottom position shown in Fig. 6. It is thus possible also to regulate the number of lateral rows of candies which will contact with the decorator D, when said decorator is in the bottom position shown in Fig. 6.

A link 57 has a forked end which is pivotally conected to the extension 40 of the sleeve 39, by means of a pivot pin 57a. A corresponding link 58 is pivotally connected to the extension 55 of the sleeve or collar 52a, which is mounted upon the corresponding reduced extension of the shaft 26. These links 57 and 58 have their adjacent ends provided with tapped recesses, whose threads are in opposite directions. The oppositely threaded shanks of the turnbuckle 59 respectively engage the tapped recesses of the links 57 and 58. The inclination of the members 40 and 55 to each other can thus be regulated. The link 54 corresponds to the link 57, the link 55d corresponds to the link 58, and the turnbuckle 56 corresponds to the turnbuckle 59. As shown in Figs. 3 and 5, the link 54 is pivotally connected to the integral extension 45 of the collar 45a, and the link 55d is pivotally connected to the integral extension 52 of the collar 53a. Said collar 53a is mounted upon the corresponding reduced extension of the shaft 26. Fig. 3 shows the stud-extension 49a, which corresponds to the stud-extension 49, both said stud-extensions 49 and 49a being fixed to the shaft 27. Fig. 3 also shows the stud-extensions 49c and 49b, which are fixed to the shaft 26, and which correspond to the elements 49 and 49a.

The operation of the improved machine is as follows:

The height of the adjustable inner side walls 18 and 19, relative to the top surface of the top run of the wire belt 2, is regulated by turning the shaft 66 by means of the handle 67. The shaft 72 is turned equally and in unison with the shaft 66, by means of the sprockets 68 and 72, and the chain 69. The worms 65 and 77 of the shaft 66 turn the worm gears 64 and 78 of the screws 63 and 79. The worms 71 and 75 of the shaft 72 turn the worm gears 72a and 76 of the screws 73 and 74.

The screws 63, 73, 74 and 79 are turned, thus vertically adjusting their respective nuts 63a, 73a, 80a and 80, thus vertically adjusting the movable walls 18 and 19, which are rigidly secured to each other and to said nuts. The alined lateral shafts 30 and 36 are thus vertically adjusted, together with their crank arms 31 and 37. The lateral shaft 17 of the spur gears 20 and 21 and the alined lateral shafts of the spur gears 22 and 23 are also simultaneously vertically adjusted so that the longitudinal axis of the shaft 26 is simultaneously vertically adjusted with the longitudinal axis of the shaft 27.

As previously noted and as shown in Fig. 6, the looped ends of the decorator are respectively supported by the rods 47 and 47a. One end of the rod 47 is turnably supported in the bearing 48, whose stud extension 49 is fixed to the shaft 27, as shown in Fig. 8. The other end of the rod 47 is turnably connected in a similar bearing, whose stud extension 49a, which is shown in Fig. 3, is also fixed to the shaft 27. The other end of the decorator D is supported upon the rod 47a, which corresponds to the rod 47. The rod 47 is turnably supported in a bearing 48a, and also in a companion bearing, whose respective stud-extensions 49b and 49c are fixed to the shaft 26, the construction being identical with that shown in Fig. 8. Therefore, the equal and simultaneous vertical adjustment of the shafts 26 and 27 correspondingly vertically adjusts the rods 47 and 47a, thus vertically adjusting the looped lateral ends of the decorator D, relative to the top surface of the top run of the feed belt 2.

The turnbuckles 58 and 59 are equally adjusted, in order to turn the sleeves or collars 45a and 39 upon the respective reduced extensions of the shaft 27, and also to turn the collars 53a and 52a upon the corresponding reduced extensions of the shaft 26. The angle between the members 40 and 55 can thus be regulated, so that said members 40 and 55 are either parallel to each other, or inclined towards each other or away from each other. The angle between the members 45 and 52 is maintained equal to the angle between the members 40 and 55, so that the decorating member hangs in smooth and uniformly curved formation from its lateral supporting rods 47 and 47a.

The effective diameter of the pulley 6 is then regulated so as to regulate the number of revolutions per minute of the driven pulley 8, thus regulating the speed of the driven shaft 12. Since the bearing pins 24 and 25 are respectively equally offset relative to the respective centers of the spur gears 22 and 23, and since said offset is equal to the respective offsets of the bearing pins 32 and 38 relative to the shafts 30 and 36, the shafts 26 and 27 will always be at the same level relative to the belt 2, and said shafts 26 and 27 will also have a longitudinal component of motion, which is either in the same direction as the feeding movement of the top run of the belt 2, or opposed to said feeding movement.

The driven shaft 12 drives the spur gear 20 by means of the sprockets 14 and 16, and the spur gear 20 drives the spur gear 22, which drives the shaft 30 by means of the sprockets 28 and 29 and the chain 29a. Since the spur gear 20 is fixed to the shaft 17, said shaft 17 drives the spur gear 21, which drives the spur gear 23, which drives the shaft 36 by means of the sprockets 33 and 35 and the chain 34.

The speed of the driven shaft 12 is regulated, so that when the decorator D is in the operative position shown in Fig. 6, said decorator D is moving in the same direction as the top run of the feed belt 2, and at substantially the same speed. The plastic coatings are therefore not smeared by the application of the decorator D, which longitudinally overlies a substantial portion of the top run of the feed belt 2, in addition to extending laterally across said feed belt 2.

After the decorator D has thus been moved downwardly to the operative position shown in Fig. 6, it is raised from said operative position, while the longitudinal speed of movement of said decorator D remains substantially equal to the longitudinal movement of the top run of the feed belt 2. The strings of coating material are thus initially drawn upwardly from the candies 1 without smearing the coating and without raising the candies from the belt 2 and without shifting the candies either longitudinally or laterally on the belt 2. As the decorator D is moved upwardly from the operative position shown in Fig. 6, the strings of coating material are drawn upwardly and the forward longitudinal speed of the decorator D becomes less than the forward longitudinal speed of the top run of the belt 2. The upwardly drawn strings of coating preferably lose their adhesion to the decorator D, substantially before the decorator D is moved upwardly to the median position which is shown in Fig. 5. The strings of coating material drop back upon their respective candies, to form the decoration 1a which is shown in Fig. 2. Said decoration may be of a great many different patterns, depending upon the perforations of the decorator D. The decorator D may be perforated in any suitable pattern, so as to draw out one or more strings of coating material from each candy, in any desired formation.

Without limiting the invention to the specific example given, the diameter of the circle 381, which is shown in Fig. 4, may be about 2 inches, so that the total vertical movement and the total longitudinal movement of the decorator D is 2 inches. In such machine, the strings of coating material lose their adhesion to the decorator D, and such strings drop back upon the respective candies, when the decorator D has been raised about 1 inch from its bottom operative position which is shown in Fig. 6. In such specific embodiment, the top run of the feed belt 2 is moved through a distance of 10–13 inches, while the crank pins 32, 38, 24 and 25 move through the complete circle 381.

The length of the contact zone between the candies and the decorator D, in a direction parallel to the movement of belt 2, is about 13 inches.

Fig. 6 shows 13 lateral rows of candies, whose coatings contact with the decorator D. The left-hand lateral row and the right-hand lateral row are designated as L and R. When the decorator is again moved to said operative position, the row R may be moved to the position of row L, or a little behind or even in front of the position of said lateral row L. The great majority of the candies thus contact only once with the decorator P. It is preferable to have each candy contact only once with the decorator, but in order to prevent missing, some of the lateral rows of candies may contact twice with the decorator, but not more than twice. The two contacts of some of the candies with the decorator is not objectionable.

As shown in Fig. 11, means are provided for retaining the members 45 and 52 in their adjusted angular position, which is secured by means of the turnbuckle 56. Identical means are provided for maintaining the members 40 and 55 in the adjusted angular relation which is secured by means of the turnbuckle 59. As shown in Fig. 11, such fixing of the angular relations between the aforesaid members, is secured by means of brackets or arms 90. Each bracket or arm 90 is of angular shape, and it is provided with legs 91 and 92. Each leg 92 is pivotally connected to one of the rods 44 or 44a. Each arm 91 is provided with a bore through which the threaded part of the respective turnbuckle passes. As shown in Fig. 10, the threaded parts of the turnbuckles 56 and 59 are respectively designated by the reference numerals 56a and 59a.

The angular arms 91 are fixed relative to the aforesaid threaded parts 56a and 59a, by means of pairs of lock nuts 93.

The brackets or arms 90 also hold the members 45 and 52, and the companion members 40 and 55, from turning around the axes of the shafts 26 and 27. Therefore the height of the bight of the decorator D remains fixed during the various movements of the decorator.

I have shown a preferred embodiment of my invention but it is clear that numerous changes and omissions can be made without departing from its spirit.

I claim:

1. Mechanism for decorating candies, comprising a movable feed belt which has a planar feed run which is adapted to support said candies, said feed run being movable longitudinally in its own plane in a predetermined feeding direction, four equal crank-members located above said feed run, said crank-members being arranged in cooperating pairs, a support turnably connected to each said pair of crank-members, said supports being spaced longitudinally from each other and being transverse to said feeding direction and being parallel to each other, a flexible decorator whose respective ends are connected to said supports, said decorator depending freely from said supports, drive mechanism for turning said crank-members continuously in the same direction and for moving said feed run continuously in said feeding direction and in unison with the movement of said crank-members, so that said flexible decorator is moved up and down relative to said feed run and said flexible decorator is also moved longitudinally back-and-forth in a direction parallel to said feeding direction, said drive mechanism moving said decorator in said feeding direction and at substantially the same speed as said feed run, when said decorator is in substantially its lowest position.

2. Mechanism for decorating candies, comprising a feed belt which has a planar feed run which is adapted to support the candies, said feed run being movable longitudinally in its own plane in a predetermined feeding direction, a flexible decorator located above said feed run, each end of said decorator being connected to a support which is movable up-and-down relative to said feed run, said supports being lateral to said feeding direction, support-actuating mechanism adapted to actuate said supports continuously and in the same direction in a predetermined path which has a vertical component and a second component which is parallel to said feeding direction so that said supports and decorator are moved bodily up and down relative to said feed run and said decorator is also moved back and forth in a direction parallel to said feeding direction, drive mechanism for actuating said belt continuously in the same direction and also actuating said support-actuating mechanism so that said decorator is moving in the same direction as said feed run and at substantially the same speed as said feed run when said decorator is in its lowest position.

3. Mechanism for decorating candies comprising a belt which has a planar feed run which is movable in its plane in a predetermined feeding direction, shaft-supports, four shafts turnably mounted in said shaft-supports above said feed run, said shafts being arranged in pairs, the shafts of each pair having coincident axes, the coincident axes of said pairs of shafts being parallel to each other and being lateral relative to said feeding direction, each shaft having a shaft-member fixed thereto, each shaft-member having a bearing pin fixed thereto and offset relative to the respective axes, the offsets of said bearing pins from their respective shafts being equal, the bearing pins of each pair of shafts having coincident axes which are parallel to the axes of said shafts, each said pair of bearing pins turnably supporting a rod, said rods being parallel to each other, each end of each rod having a bearing fixed thereto, the bearings of each rod being an aligned pair, a decorator-support turnably mounted in each pair of aligned bearings, a depending arm fixed to each end of each rod, a bar located below each said decorator-support and mounted in a pair of said respective depending arms which are fixed to the same rod, a flexible decorator connected to said decorator-supports and depending from said decorator-supports and in contact with parts of said bars and depending below said bars, mechanism for driving said shafts in unison with the movement of said feed run in said feeding direction so that said bearing pins move synchronously and in unison through equal circular paths to move said decorator up and down relative to said feed run, and also to move said decorator back and forth relative to said feed run, said mechanism actuating said decorator in the same direction as said feeding direction when said decorator is substantially in its bottom position.

4. Mechanism according to claim 3 in which the distance between said decorator-supports exceeds the diameter of said circular paths.

5. Mechanism according to claim 3, including means for regulating the angle between each pair of said depending arms, each said pair of depending arms being fixed to the corresponding respective ends of different rods.

6. Mechanism according to claim 3, comprising means for simultaneously and equally adjusting said shaft-supports vertically relative to said feed-run.

GEORGE S. PERKINS.